Figure 1:
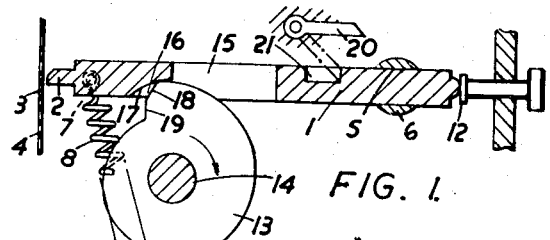

Sept. 6, 1955  H. E. HOLMAN ET AL  2,716,921
INTERMITTENT FILM FEEDING MECHANISM
Filed Dec. 4, 1951  2 Sheets-Sheet 1

Inventors
HERBERT EDWARD HOLMAN
GEORGE CHARLES NEWTON
By Ralph E. Atherton
Attorney Sept. 6, 1955     H. E. HOLMAN ET AL     2,716,921
INTERMITTENT FILM FEEDING MECHANISM
Filed Dec. 4, 1951     2 Sheets-Sheet 2

Inventors
HERBERT EDWARD HOLMAN
GEORGE CHARLES NEWTON
By Ralph E. Atherton
Attorney

United States Patent Office 2,716,921
Patented Sept. 6, 1955

2,716,921
INTERMITTENT FILM FEEDING MECHANISM

Herbert Edward Holman, West Drayton, and George Charles Newton, Anerley, London, England, assignors to Electric & Musical Industries Limited, Hayes, England, a company of Great Britain Application December 4, 1951, Serial No. 259,754

Claims priority, application Great Britain December 8, 1950

9 Claims. (Cl. 88—18.4)

This invention relates to intermittent film feeding mechanism such as is employed in cinematograph cameras, projectors and television film scanners.

Usually such intermittent mechanism comprises one or more claws which are adapted to engage at appropriate times with the sprocket holes in the film so as to cause the film to be moved intermittently through the film gate. It is desirable that the time taken for imparting the intermittent movement to the film should be as short as possible so as in the case of a projector to increase the time of actual projection or in the case of a camera to increase the available time for each exposure so as to obtain greater latitude in the use of lens stops and in the actinic speed of films. In the case of television film scanners or of cameras for recording television pictures, it is even more desirable for the movement of the film to be accomplished in as short a time as possible and preferably in a time comparable to the frame fly-back time of the cathode ray beam associated with the film scanner or the receiver from which a recording of the reproduced pictures are being made.

Usually the intermittent mechanism is arranged so that all of the energy necessary to cause movement of the film is developed during the period of such movement with the result that the power required to effect any substantial increase in the speed of movement of the film is beyond the limits of practical mechanical construction.

The object of the present invention is to provide an improved mechanism for intermittently moving films in which the speed of the intermittent movement is increased by means of a comparatively simple mechanism.

According to the invention, mechanism for intermittently moving films is provided comprising a claw carried by an arm which is mounted for pivotal and axial movement and a cam is provided co-operating with said arm so as to cause said arm to move during the interval when the film is stationary so as to store energy in a spring or similar device associated with said arm, said cam being shaped so that when it is desired to move said film said cam causes said claw to move into engagement with said film and to allow the energy stored in said spring to move said arm to cause movement of said film.

Figure 2:
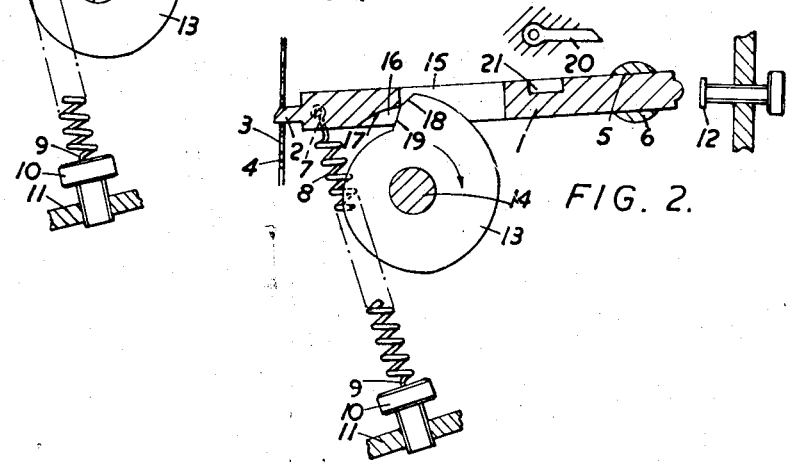
Figure 3:
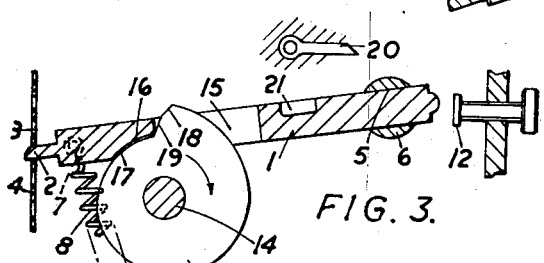
Figure 4:
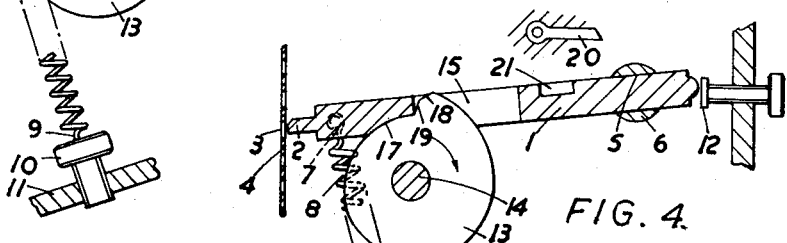
Figure 9:
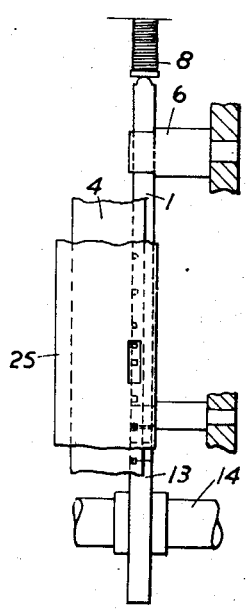

In order that the said invention may be clearly understood and readily carried into effect, it will now be more fully described with reference to the accompanying drawings, in which:

Figure 1 is a side elevation, partly in section, of a mechanism in accordance with one embodiment of the invention, Figures 2, 3 and 4 are views similar to that shown in Figure 1 but illustrating the parts in different positions, Figures 5, 6, 7 and 8 are views similar to those of Figures 1 to 4 but illustrating a further embodiment of the invention, and Figure 9 is a front elevation of the mechanism according to the embodiment shown in Figures 5 to 8.

In the embodiment of the invention shown in Figures 1 to 4 of the drawings, an arm 1 is provided of a substantial rectangular form in cross-section and one end of the arm is provided with one or a pair of suitably shaped claws 2 for engagement with the sprocket holes 3 in a film 4. The end of the arm opposite to the end carrying said claws is arranged to slide in a correspondingly shaped aperture 5 in a spindle 6 which is mounted for rotation about its axis. The end of the arm carrying said claws is attached to one end 7 of a tension spring 8, the other end 9 of which is anchored to a screw 10 which is threaded into a support whereby the degree of tension of the spring can be adjusted. Preferably the support is adjustably mounted so that it can be moved in the plane of the paper to enable the angular relationship of the spring 8 with respect to the arm 1 to be adjusted. The spring 8 is anchored at an angle less than 90° with respect to the arm so that it normally tends to move said arm 1 downwardly and also tends to move said arm away from the film 4. The end of said arm remote from said claws 2 may be arranged to abut against an adjustable mounted stop 12 carried by a relatively fixed part of the mechanism so that the position of said claws 2 relative to the film can be adjusted. Said arm 1 is adapted to be moved against the tension of said spring 8 by means of a snail cam 13, which is mounted for rotation beneath said arm 1 on a shaft 14. In order to accommodate said cam 13, the arm 1 is provided with a slot 15 and the edge of said slot nearest to said claws 2 is provided with a recess 16 having an arcuate shaped bottom bearing surface 17, the arc of which closely follows the arcuate contour of the cam 13. The bearing surface 17 normally rests on the periphery of the cam as shown in Figure 4 so that during rotation of the cam in the direction of the arrow the arm 1 is raised by the ascending surface of the cam against the tension of the spring 8 as shown in Figure 1 and when the peak of the cam is reached, the stored energy in the spring is released so as to move the arm downwardly and so move the film. The surface of the cam between the peak and dell of the cam slopes away from the ascending surface in a direction opposite to the direction of rotation of the cam and has a first descending surface 18 so that after the peak of the cam is reached, the inclined surface 18 in conjunction with the spring causes said arm to move towards the film 4 so that the claws engage the sprocket holes as shown in Figure 2 and thereafter downward movement of said arm on to the dell of the cam to the position shown in Figure 3 is effected by the stored energy in the spring 8 and controlled by the second descending surface 19 which has an increased slope compared with the surface 18. By suitably tensioning the spring, sufficient energy can be stored to effect the desired movement of the film in a very short period of time. After the dell on the cam is reached, continued rotary movement of the cam raises said arm and the spring causes movement of said arm so as to effect withdrawal of the claws from the sprocket holes as shown in Figure 4.

In some mechanism, when used for example in television film scanners, it may be desirable to enable the driving motor for said cam to be brought into phase with the scanning beam of the film scanner without producing movement of the film. For this purpose a detent 20 may be provided, adapted to engage a recess 21 on said arm 1 so that although the cam can be driven by said motor, the detent 20 when engaging the recess 21 serves to prevent said arm from moving forwardly when the peak of the cam is reached. The detent is arranged to be conveniently brought into engagement or disengagement with the recess when required and of course it should be arranged that each time the detent is manipulated to prevent movement of said arm, the feed and take-up sprockets of the film driving mechanism should be stopped.

Figure 5:
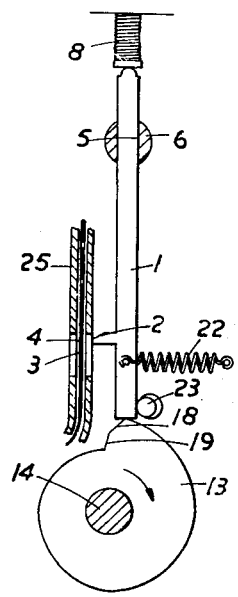
Figure 6:
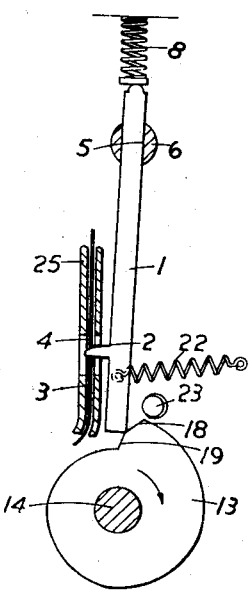
Figure 7:
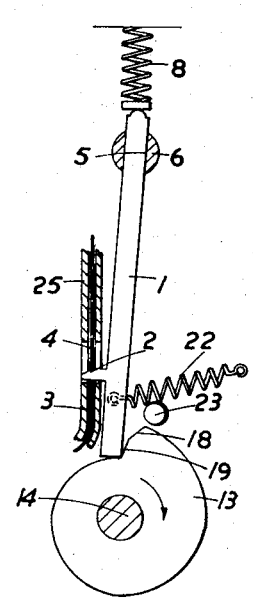
Figure 8:
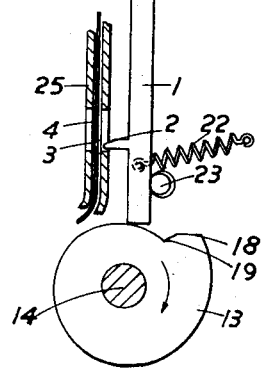

In the embodiment of the invention described above the spring 8 is so positioned that in conjunction with the friction between the cam 13 and the arm 1, it serves to withdraw the claw 2 from engagement with the film at the appropriate time. Furthermore, it will be observed that the arm 1 is disposed so that energy is stored in the spring 8 during pivotal movement of said arm by the cam and that energy is stored in said spring by tensioning thereof. In the embodiment of the invention shown in Figures 5 to 9 a somewhat different mechanism is employed which differs mainly from that shown in Figures 1 to 4 in that energy is stored in a spring during axial movement of an arm and that the claw which engages the film is retracted from the film by the provision of a further spring and that the spring in which energy is stored is a compression spring. In Figures 5 to 9 parts which correspond to those shown in Figures 1 to 4 are given similar reference numerals. As shown in Figures 5 to 9 an arm 1 is provided of substantially rectangular form in cross section and projecting from the said arm is a claw 2 for engagement with sprocket holes 3 in the film 4 arranged in a film gate 25. The end of the arm opposite to the end carrying the claw 2 is arranged to slide in a correspondingly shaped aperture 5 in a spindle 6 which is mounted for rotation above its axis. The upper end of the arm 1 engages a compression spring 8 so that normally it tends to urge the arm 1 downwardly into engagement with the surface of a snail cam 13 which is mounted for rotation beneath the arm 1 on a shaft 14. A tension spring 22 normally urges the arm 1 in a direction so as to move the claw 2 out of engagement with the film 4, the movement of the arm 1 under the action of the spring 22 being limited due to its engagement with an eccentrically mounted stop 23, the eccentricity of the stop 23 being such that it can be moved into a position to prevent the claw 2 from engaging the film during the initial starting movement of the mechanism. During rotation of the cam 13 in the direction of the arrow the arm 1 is raised by the cam so as to compress the spring 8, the spring 22 normally maintaining the claw 2 out of engagement with the film as shown in Figure 5. When the peak of the cam is reached the energy stored in the spring 8 is released so as to move the arm 1 downwardly and so move the film. The surface of the cam 13 between the peak and dell of the cam is shaped as described with reference to Figure 1 so that after the peak of the cam is reached the surface 18 in conjunction with the spring 8 causes said arm to move toward the film 4 so that the claw engages the sprocket hole in the film as shown in Figure 6. Thereafter downward movement of the arm on to the dell of the cam to the position shown in Figure 7 is effected by the stored energy in the spring 8 and controlled by the inclined surface 19. By suitably tensioning the spring sufficient energy can be stored to effect the desired movement of the film in a very short period of time. After the dell on the cam is reached the spring 22 in conjunction with the frictional engagement of the arm 1 with the cam 13 causes the claw to be withdrawn from the film to the position shown in Figure 8 and thereafter continued rotational movement of the cam moves the parts to the position shown in Figure 5.

If desired the angular velocity of the cam 13 may be varied during each revolution as by driving said cam through suitable mechanism such as by elliptical or eccentric gearing or the like so that during the period when the arm 1 is intended to be moved to cause the claw 2 to engage the film, the angular velocity of the cam is reduced to facilitate the arm 2 following the surface 18 of the cam.

What we claim is:

1. A mechanism for intermittently moving films, comprising an arm, means mounting said arm for pivotal and axial movement, a claw carried by said arm, a rotatably mounted cam co-operatively associated with said arm to impart movement thereto, energy storage means coupled to said arm, said cam having an ascending surface to impart movement in one direction to said arm against an opposing force of said storage means to store energy in said storage means, said ascending surface terminating in a first descending surface sloping away from said ascending surface in a direction opposite to the direction of rotation of said cam to move said arm towards the film to engage said claw with said film under the action of the energy stored in said storage means, said cam having a second descending surface of increased slope compared with said first descending surface to enable said stored energy to effect a rapid advance of said film after engagement of said claw with said film.

2. A mechanism for intermittently moving films, comprising an arm, means mounting said arm for pivotal and axial movement, a claw carried by said arm, a rotatably mounted cam coupled to said arm, a spring coupled to said arm to urge said arm into engagement with said cam, said cam having an ascending surface to impart movement in one direction to said arm against the opposing force of said spring to store energy in said spring, said ascending surface terminating in a first descending surface sloping away from said ascending surface in a direction opposite to the direction of rotation of said cam to move said arm towards the film to engage said claw with said film under the action of the energy stored in said spring, said cam having a second descending surface of increased slope compared with said first descending surface to enable said stored energy to effect a rapid advance of said film after engagement of said claw with said film.

3. A mechanism for intermittently moving films, comprising an arm, means mounting said arm for pivotal and axial movement, a claw carried by said arm, a rotatably mounted cam, a spring coupled to said arm to urge said arm into engagement with said cam, said cam having an ascending surface to impart movement in one direction to said arm against the opposing force of said spring to store energy in said spring, said ascending surface terminating in a first descending surface sloping away from said ascending surface in a direction opposite to the direction of rotation of said cam to move said arm towards the film to engage said claw with said film under the action of the energy stored in said spring, said cam having a second descending surface of increased slope compared with said first descending surface to enable said stored energy to effect a rapid advance of said film after engagement of said claw with said film, and means anchoring said spring at an angle of less than 90° with respect to said arm to cause said spring to effect axial movement of said arm away from said film after said rapid advance.

4. A mechanism for intermittently moving films, comprising an arm, means mounting said arm for pivotal and axial movement, a claw carried by said arm, a rotatably mounted cam, a spring coupled to said arm to urge said arm into engagement with said cam, said cam having an ascending surface to impart pivotal movement to said arm in one direction against the opposing force of said spring to store energy in said spring, said ascending surface terminating in a first descending surface sloping away from said ascending surface in a direction opposite to the direction of rotation of said cam to move said arm in an axial direction under the action of the energy stored in said spring, said cam having a second descending surface of increased slope compared with said first descending surface to enable said stored energy to effect a pivotal movement of said arm in a different direction to effect a rapid advance of said film.

5. A mechanism for intermittently moving films, comprising an arm, means mounting said arm for pivotal and axial movement, a claw carried by said arm, a rotatably mounted cam, a spring coupled to one end of said arm between said claw and the axis of rotation of said cam to urge said arm into engagement with said cam, said cam having an ascending surface to impart pivotal movement to said arm in one direction against the opposing force of said spring to store energy in said spring, said ascending surface terminating in a first descending surface sloping away from said ascending surface in a direction opposite to the direction of rotation of said cam to move said arm in an axial direction under the action of the energy stored in said spring, said cam having a second descending surface of increased slope compared with said first descending surface to enable said stored energy to effect a pivotal movement of said arm in a different direction to effect a rapid advance of said film, and means anchoring said spring at an angle of less than 90° with respect to said arm, whereby said spring moves said arm away from said film after said rapid advance.

6. A mechanism for intermittently moving films, comprising an arm, means mounting said arm for pivotal and axial movement, a claw carried by said arm, a rotatably mounted cam engaging said arm intermediate the ends thereof, a spring coupled to one end of said arm between said claw and the axis of rotation of said cam to urge said arm into engagement with said cam, said cam having an ascending surface to impart pivotal movement to said arm in one direction against the opposing force of said spring to store energy in said spring, said ascending surface terminating in a first descending surface sloping away from said ascending surface in a direction opposite to the direction of rotation of said cam to move said arm in an axial direction under the action of the energy stored in said spring, said cam having a second descending surface of increased slope compared with said first descending surface to enable said stored energy to effect a pivotal movement of said arm in a different direction to effect a rapid advance of said film.

7. A mechanism for intermittently moving films, comprising an arm, means mounting said arm for pivotal and axial movement, a claw carried by said arm, a rotatably mounted cam engaging said arm intermediate the ends thereof, a spring coupled to one end of said arm between said claw and the axis of rotation of said cam to urge said arm into engagement with said cam, said cam having an ascending surface to impart pivotal movement to said arm in one direction against the opposing force of said spring to store energy in said spring, said ascending surface terminating in a first descending surface sloping away from said ascending surface in a direction opposite to the direction of rotation of said cam to move said arm in an axial direction under the action of the energy stored in said spring, said cam having a second descending surface of increased slope compared with said first descending surface to enable said stored energy to effect a pivotal movement of said arm in a different direction to effect a rapid advance of said film, and means anchoring said spring at an angle of less than 90° with respect to said arm, whereby said spring moves said arm away from said film after said rapid advance.

8. A mechanism for intermittently moving films, comprising an arm, means mounting said arm for pivotal and axial movement, a claw carried by said arm, a rotatably mounted cam, a spring coupled to one end of said arm to urge said arm into engagement with said cam, said cam having an ascending surface to impart axial movement to said arm in one direction against the opposing force of said spring to store energy in said spring, said ascending surface terminating in a first descending surface sloping away from said ascending surface in a direction opposite to the direction of rotation of said cam, whereby pivotal movement is imparted to said arm to move said arm towards the film under the action of said spring, said cam having a second descending surface of increased slope compared with said first descending surface to enable said stored energy to effect an axial movement of said arm to effect a rapid advance of said film.

9. A mechanism according to claim 8, including a further spring coupled to said arm and positioned to withdraw said claw from said film after said rapid advance.

References Cited in the file of this patent

UNITED STATES PATENTS

| | | |
|---|---|---|
| 1,199,221 | Taylor | Sept. 26, 1916 |
| 2,080,443 | Sperberg | May 18, 1937 |
| 2,481,115 | Heurtier | Sept. 6, 1949 |